Dec. 1, 1953          F. G. DAVIS ET AL          2,661,039
          VEGETABLE SLICING AND DICING APPARATUS
Filed June 13, 1951                              2 Sheets-Sheet 1

INVENTORS
FRANK G. DAVIS
MARIAN M. KENNEDY
BY *Howard J. Whelan*
ATTORNEY

Dec. 1, 1953   F. G. DAVIS ET AL   2,661,039
VEGETABLE SLICING AND DICING APPARATUS
Filed June 13, 1951   2 Sheets-Sheet 2
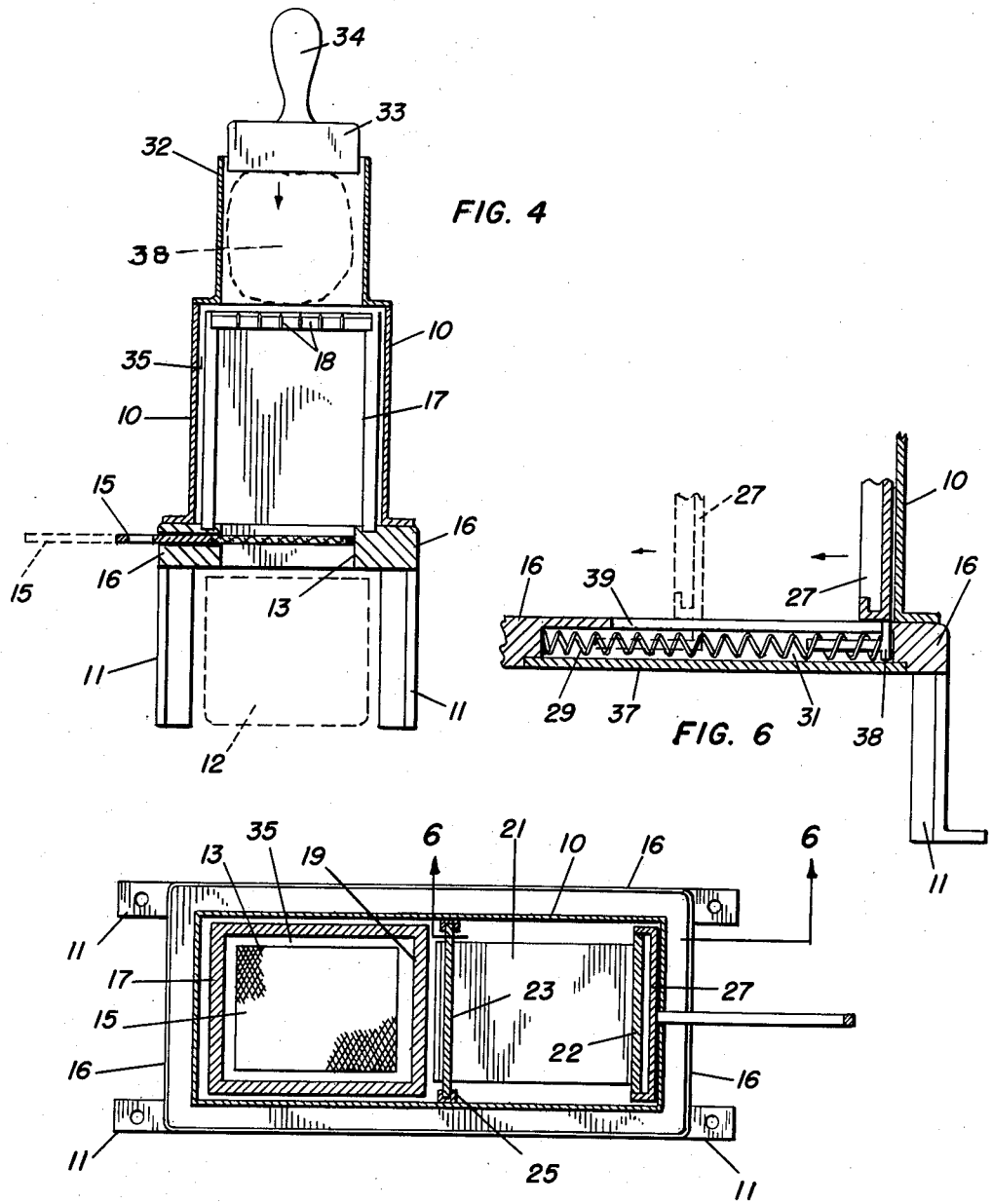
INVENTORS
FRANK G. DAVIS
MARIAN M. KENNEDY
BY Howard J. Whelan.
ATTORNEY Patented Dec. 1, 1953

2,661,039

UNITED STATES PATENT OFFICE 2,661,039

VEGETABLE SLICING AND DICING APPARATUS

Frank G. Davis and Marian M. Kennedy, Baltimore, Md.

Application June 13, 1951, Serial No. 231,386

6 Claims. (Cl. 146—78)

This invention relates to apparatus for cutting and dicing vegetables including fruits and more particularly to the separation of same into sizes and shapes of predetermined types. It has for its object the provision of a kitchen utensil that will be simple in construction, effective in operation and economical to manufacture.

Another object of the invention is to provide a new and improved vegetable cutting utensil that can be adjusted to make different lengths and widths of vegetable cuttings.

Other objects will become apparent as the invention is more fully set forth.

For a better understanding of the invention and the objects thereof, reference is made to the accompanying drawings. These drawings in conjunction with the following description illustrate a particular form of the invention by way of example, while the claims appended hereto, indicate the scope of the invention.

In the drawings:

Figure 4 is a transverse section taken along lines 4—4 of Figure 1;

Figure 5 is a plan section taken along lines 5—5 of Figure 2; and

Figure 6 is a longitudinal section taken along lines 6—6 of Figure 5.

Similar reference characters refer to the same parts throughout the drawings.

Figure 1:
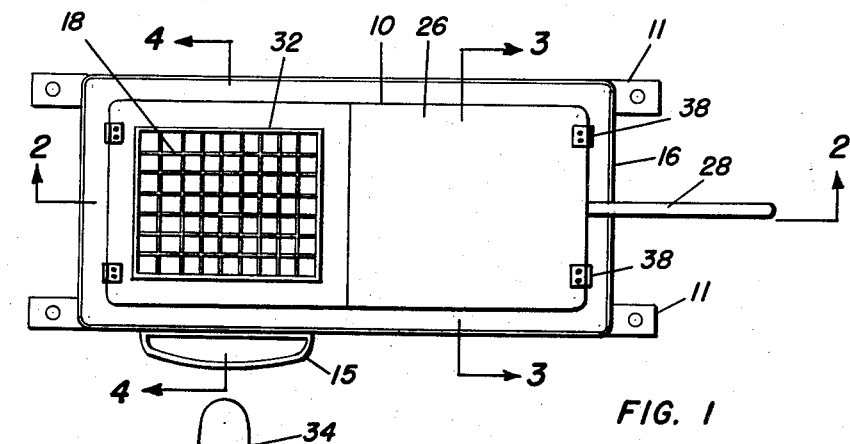
Figure 1 is a plan view of a vegetable cutter embodying this invention.
Figure 2:
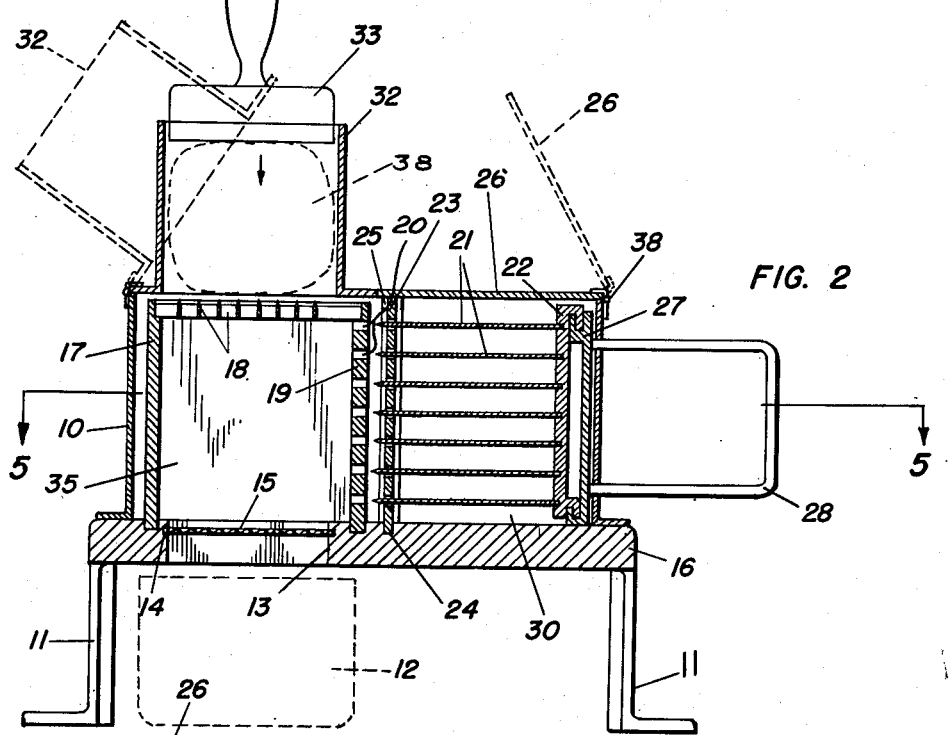
Figure 2 is a side elevation in section taken on line 2—2 of Figure 1.
Figure 3:
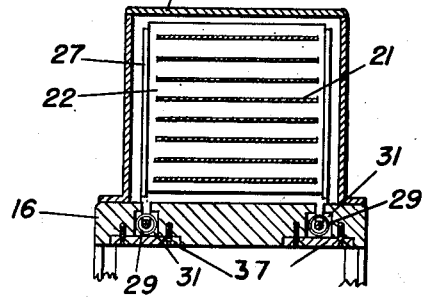
Figure 3 is a transverse section taken along lines 3—3 of Figure 1.

The device shown in the drawings consists of a housing 10 that stands on four corner posts 11, high enough to allow a container 12 to be placed under a discharge opening 13 provided in it. The opening 13 is preferably of rectangular contour and is encompassed by lateral slots 14 serving as guides for the insertion and withdrawal of a flat screen shelf 15. The screen fits snugly within the opening and holds the vegetable strips resting on it as they are cut from the whole vegetable 38. The housing 10 is of rectangular form having a box-like contour. Its base 16 has the opening 13 disposed towards the rear of the housing. Over the opening 13 is placed a removable enclosed vegetable receptacle 17 which is large enough to contain the strips of the cut vegetable. It is of cubical form with its upper end open to allow the insertion of the articles to be cut. However this open end is crossed with very sharp stationary knives 18 arranged in square-cell formation so the inserted article will be cut into strips of square cross-section. The lateral wall 19 vertically disposed at the side of the strips as they are cut has a series of slots 20 aligned with the flat knives 21 held horizontally by a support 22 at the side of the receptacle 17 in position to reciprocate across through the receptacle and cut the strips as they arrange themselves therein. A guide plate 23 is vertically set on the housing base 16 to support the end portions of the movable knives 21 so they will not sag during their use in cutting, as well as clean them off after they have done their cutting work. The guide plate 23 fits in a groove 24 in the base 16 to hold it upright on the base, and its sides are held by channels 25 mounted on the sides of the housing 10. The cover 26 hinged at 38 to the housing closes in the space in which the knives 21 operate and allows access thereto for inspection, repair, or replacement.

The support 22 is slid into place in a shell 27 and movable in the knife chamber 30 arranged parallel to the support. This shell 27 is attached to a hand grip 28 that serves to permit its manipulation from outside of the housing. This manipulation is induced by the operator as he pushes the hand grip towards the housing. Coil springs 29 operating in passages 31 in the base 16 return the grip, support and knives to the extended position when the operator releases the grip.

A feed box 32 open at the top and bottom, is removably mounted on the housing 10. It is made large enough to take the vegetable to be cut. It is made preferably of rectangular contour with the top open for the insertion of the vegetable. A piston 33 fits the interior of the box 32 and is pushed down on the vegetable by the user gripping and pushing down on the handle 34. The open bottom of the box 32 registers with the opening and knives 18 so that the vegetable will be cut by the latter and the strips fall into the chamber 35. The knives 21, are like flat plates with sharpened front edges.

The operation is simple: The operator places the vegetable or fruit in the feed box 32, pushes down on it with the piston 33 until the vegetable is forced past the knives 18. The pieces cut by the knives 18 fall into the chamber 35 and as they are approximately the same length as the vegetable they are cut from they stand erect in the chamber. The operator pushes on the grip 28 and forces the flat horizontal knives 21 into the chamber 35 so that they can cut transversely across the vertical pieces and dice them. The juice from the cut pieces drips through the screen 15 and is caught in a container 12. When the diced pieces are ready, the operator slides the screen 15 out of the opening 13 and allows them to fall into the container also. The screen 15 is then replaced and another vegetable passes through the same process.

The movable knives 21 are returned to their starting position under the tension of the springs 29 when the operator releases the grip 28. The springs 29 are installed in the base 16 and held in there by a cover plate 37 fastened to the base, as indicated in Figure 6. The springs press on lugs 38 extended from the shell 27, which run in longitudinal slots 39 for the length of the travel of the knives 21.

While but one general form of the invention is shown in the drawings and described in the specifications, it is not desired to limit this application for patent to this particular form, as it is appreciated that other forms of construction could be made that would use the same principles and come within the scope of the appended claims.

Having thus described the invention, what is claimed is:

1. A vegetable cutter comprising in combination, a housing including a base, said housing having a chamber for the reception of cut pieces of the vegetable therein, a set of stationary knife means situated in the housing and arranged to cut said vegetable when same is forced against said means and passes the pieces into said chamber, a manually movable screen in the bottom wall of the housing to permit juices of the cut pieces to drip therethrough, another wall in said housing having a plurality of slots therein aligned with one another and disposed at predetermined spaced intervals from the bottom to the top of said housing, movable knives passable through said slots to engage and cut through said pieces in the chamber, means for guiding said knives through said housing into said chamber, means for manipulating said knives so they can be manually operated from the exterior of said housing, and spring means separate and independent from the manipulating means for returning the knives to an original starting position in the housing when they are not so operated.

2. A vegetable cutter comprising in combination, a housing including a base, said housing having a chamber for the reception of cut pieces of the vegetable therein, a set of stationary knife means situated in the housing and arranged to cut said vegetable when same is forced against said means and passes the pieces into said chamber, a manually movable screen in the bottom wall of the housing to permit the juices of the cut pieces to drip therethrough, another wall in said housing having a plurality of slots therein aligned with one another and disposed at predetermined spaced intervals from the bottom to the top of said housing, movable knives passable through said slots to engage and cut through said pieces in the chamber, means for guiding said knives through said housing into said chamber, means for manipulating said knives so they can be manually operated from the exterior of said housing, spring means separate and independent from the manipulating means for returning the knives to an original starting position in the housing when they are not so operated, a container for holding the vegetable to be cut situated above said chamber and stationary knife means.

3. A vegetable cutter comprising in combination, a housing including a base, said housing having a chamber for the reception of cut pieces of the vegetable therein, a set of stationary knife means situated in the housing and arranged to cut said vegetable when same is forced against said means and passes the pieces into said chamber, a manually movable screen in the bottom wall of the housing to permit the juices of the cut pieces to drip therethrough, another wall in said housing having a plurality of slots therein aligned with one another and disposed at predetermined spaced intervals from the bottom to the top of said housing, movable knives passable through said slots to engage and cut through said pieces in the chamber, means for guiding said knives through said housing into said chamber, means for manipulating said knives so they can be manually operated from the exterior of said housing, spring means separate and independent from the manipulating means for returning the knives to an original starting position in the housing when they are not so operated, a container for holding the vegetable to be cut situated above said chamber and stationary knife means, said housing having a knife chamber in which the movable knives can reciprocate through the wall with said slots forming an end partition between it and the first mentioned chamber, a cover for said knife chamber mounted on the housing and openable to permit access to it.

4. A vegetable cutter comprising in combination a housing including a base, said housing having a chamber for the reception of cut pieces of the vegetable therein, a set of stationary knife means situated in the housing and arranged to cut said vegetable when same is forced against said means and passes the pieces into said chamber, a manually movable screen in the bottom wall of the housing to permit the juices of the cut pieces to drip therethrough, another wall in said housing having a plurality of slots therein aligned with one another and disposed at predetermined spaced intervals from the bottom to the top of said housing, movable knives passable through said slots to engage and cut through said pieces in the chamber, means for guiding said knives through said housing into said chamber, means for manipulating said knives so they can be manually operated from the exterior of said housing, spring means separate and independent from the manipulating means for returning the knives to an original starting position in the housing when they are not so operated, a container for holding the vegetable to be cut situated above said chamber and stationary knife means, said housing having a knife chamber in which the movable knives can reciprocate through the wall with said slots forming an end partition between it and the first mentioned chamber, a cover for said knife chamber mounted on the housing and openable to permit access to it, and means for supporting the housing above a surface, and providing a space for the placement of a container underneath said screen.

5. A vegetable cutter comprising in combination, a housing including a base, said housing having a chamber for the reception of cut pieces of the vegetable therein, a set of stationary knife means situated in the housing and arranged to cut said vegetable when same is forced against said means and passes the pieces into said chamber, a manually movable screen in the bottom wall of the housing to permit the juices of the cut pieces to drip therethrough, another wall in said housing having a plurality of slots therein aligned with one another and disposed at predetermined spaced intervals from the bottom to the top of said housing, movable knives passable through said slots to engage and cut through said pieces in the chamber, means for guiding said knives through said housing into said chamber, means for manipulating said knives so they can be manually operated from the exterior of said housing, spring means separate and independent from the manipulating means for returning the knives to an original starting position in the housing when they are not so operated, a container for holding the vegetable to be cut situated above said chamber and stationary knife means, said housing having a knife chamber in which the movable knives can reciprocate through the wall with said slots forming an end partition between it and the first mentioned chamber, a cover for said knife chamber mounted on the housing and openable to permit access to it, means for supporting the housing above a surface, and providing a space for the placement of a container underneath said screen, said screen being removable to permit the ejection of the contents from said first mentioned chamber.

6. A vegetable cutter comprising in combination, a housing including a base, said housing having a chamber for the reception of cut pieces of the vegetable therein, a set of stationary knife means situated in the housing and arranged to cut said vegetable when same is forced against said means and passes the pieces into said chamber, a manually movable screen in the bottom wall of the housing to permit the juices of the cut pieces to drip therethrough, another wall in said housing having a plurality of slots therein aligned with one another and disposed at predetermined spaced intervals from the bottom to the top of said housing, movable knives passable through said slots to engage and cut through said pieces in the chamber, means for guiding said knives through said housing into said chamber, means for manipulating said knives so they can be manually operated from the exterior of said housing, spring means separate and independent from the manipulating means for returning the knives to an original starting position in the housing when they are not so operated, a container for holding the vegetable to be cut situated above said chamber and stationary knife means, said housing having a knife chamber in which the movable knives can reciprocate through the wall with said slots forming an end partition between it and the first mentioned chamber, a cover for said knife chamber mounted on the housing and openable to permit access to it, means for supporting the housing above a surface, and providing a space for the placement of a container underneath said screen, said screen being removable to permit the ejection of the contents from said first mentioned chamber, said movable knives including a handle for holding them and arranged for attaching them to said manipulating means.

FRANK G. DAVIS.
MARIAN M. KENNEDY.

References Cited in the file of this patent

UNITED STATES PATENTS

| Number | Name | Date |
|---|---|---|
| 2,353,607 | Young | July 11, 1944 |
| 2,559,554 | Zahner et al. | July 3, 1951 |

FOREIGN PATENTS

| Number | Country | Date |
|---|---|---|
| 333,677 | Germany | Mar. 2, 1921 |
| 344,416 | Germany | Nov. 22, 1921 |
| 471,678 | Great Britain | Sept. 6, 1937 |